April 21, 1970 D. E. JANKE 3,507,054
ELECTRONIC CONTROL CIRCUIT FOR A DRYER USING
A PIEZOELECTRIC CERAMIC
Filed Sept. 25, 1967 2 Sheets-Sheet 1
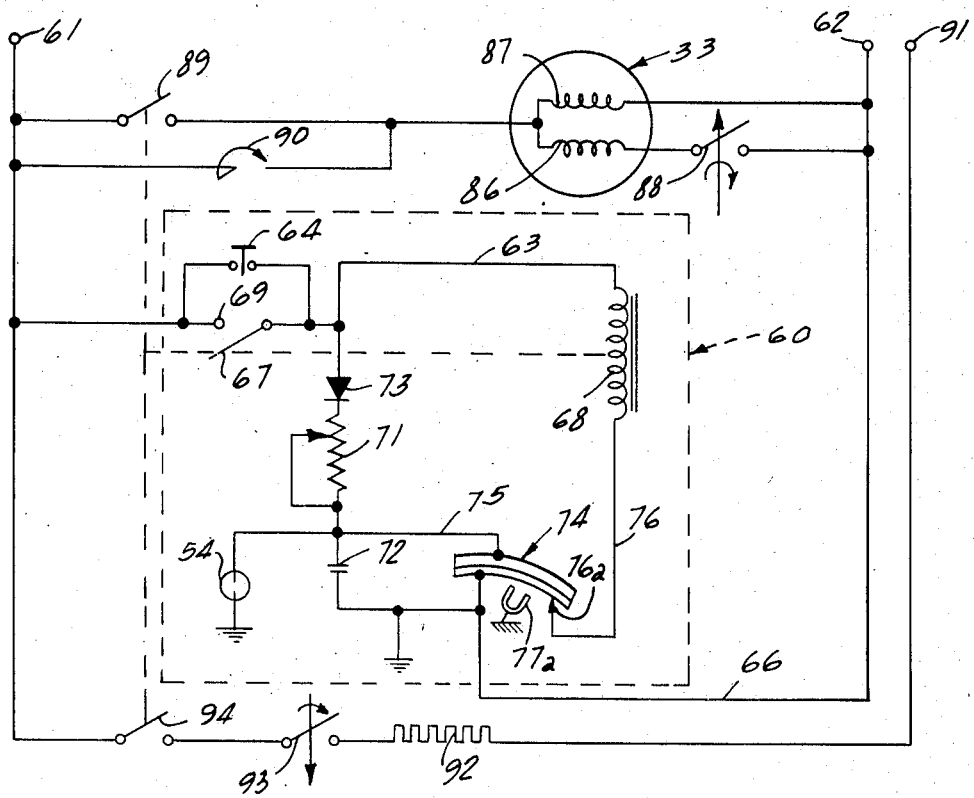
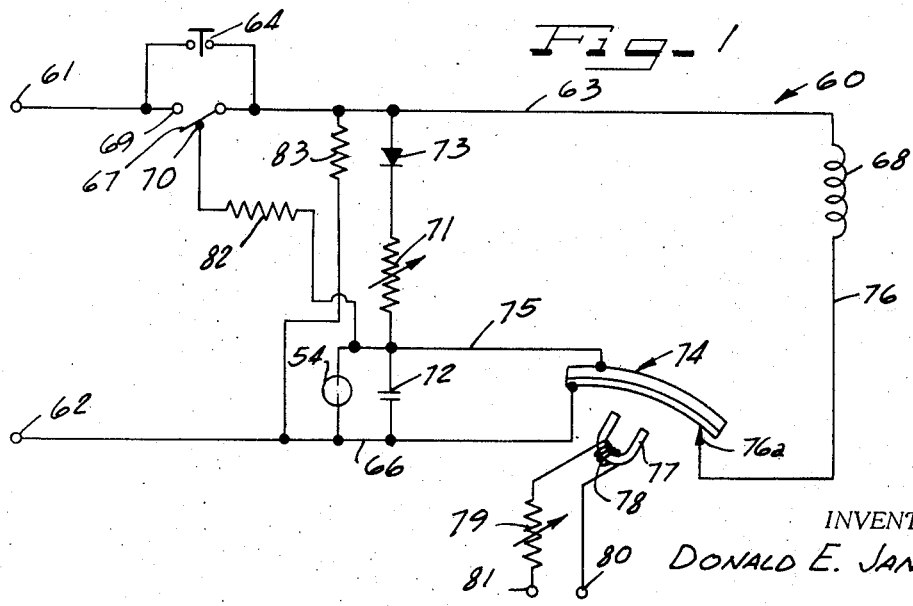
INVENTOR.
DONALD E. JANKE
BY *Hill, Sherman, Meroni, Gross & Simpson* ATTORNEYS

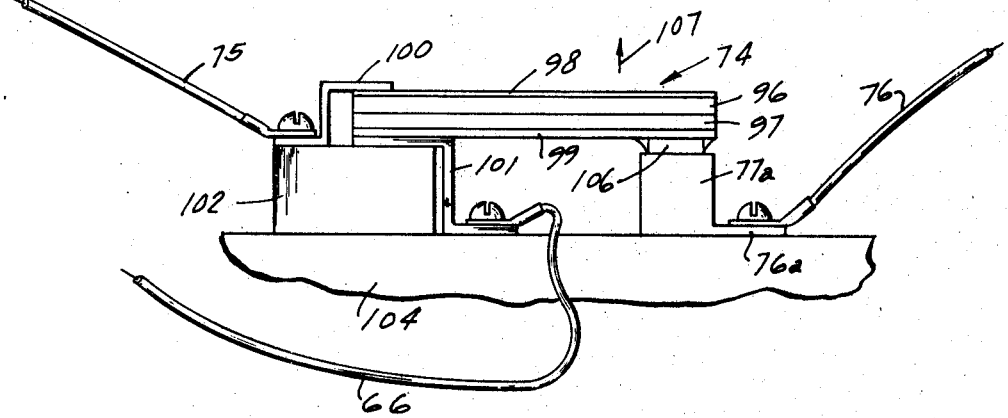

United States Patent Office 3,507,054
Patented Apr. 21, 1970

3,507,054
ELECTRONIC CONTROL CIRCUIT FOR A DRYER USING A PIEZOELECTRIC CERAMIC
Donald E. Janke, Benton Harbor, Mich., assignor to Whirlpool Corporation, Benton, Harbor, Mich., a corporation of Delaware
Filed Sept. 25, 1967, Ser. No. 670,129
Int. Cl. F26b 19/00
U.S. Cl. 34—45  2 Claims

ABSTRACT OF THE DISCLOSURE

A control circuit for use in an appliance to control the termination of a sequence of the appliance or the termination of operation of the appliance in response to sensed conditions. A resistor, diode and capacitor are connected in series across a source of power to cause the capacitor to charge at a predetermined rate. A sensing element is positioned within the appliance to sense a predetermined condition within the appliance and is connected in parallel with the capacitor of the control circuit to control the charging rate of the capacitor. A piezoelectric ceramic constituting a transducer is also connected in parallel with the capacitor and the sensing element. The transducer senses the charge across the capacitance and converts the electrical signal information sensed across the capacitance to mechanical movement. The mechanical movement of the transducer is used to actuate a switching element, which is formed as an integral part of the transducer, to control the operation of the appliance. Furthermore, the impedance of the transducer is sufficiently high so as to exhibit practically no load across the capacitor.

BACKGROUND OF THE INVENTION

Field of the invention

This invention relates generally to a control system for an appliance and more particularly to a control system which has particular utility when used with a clothes dryer of the type having a treatment zone wherein is provided sensing means for sensing the wetness of the clothes being tumbled within the drum.

Description of the prior art

Heretofore, clothes dryers and other appliances were provided with means for sensing the relative dryness of material placed within the appliance to actuate a relay circuit which, in turn, would function to terminate the sequence or operation of the appliance. However, such control circuits require high impedance isolation means between the actual sensing circuit and the relay circuit which directly controls the motors and other devices of the appliance. Furthermore, in so utilizing devices it is often necessary to amplify the control signal developed by the sensing element in order to have sufficient power to operate the relay. Accordingly, appliance control circuits of the prior art are generally complex and expensive in view of the complexity and increased number of components required for proper control of the appliance.

SUMMARY OF THE INVENTION

In accordance with this invention an improved control circuit utilizes a transducer device to be operated in response to a control signal which corresponds to the wetness of the clothes within the drum, and which transducer device also functions as an isolation element between a high impedance sensing circuit and a low impedance relay or actuating circuit.

More specifically, the present invention utilizes a piezoelectric bender transducer in an electronic control circuit for a clothes dryer. On one side of the piezoelectric bender transducer is formed a conductive ferromagnetic material so that it may also serve as the movable contact of a switch. This arrangement greatly simplifies the control circuit as well as decreases the number of components required for proper operation of a clothes dryer.

By utilizing a piezoelectric bender transducer in the circuit arrangement of the present invention, the piezoelectric bender transducer can be energized directly by the sensing control portion of the circuit without intermediate amplification or switching circuitry connected between the sensing portion of the circuit and the piezoelectric bender transducer. The conductive and magnetic surface applied to one side of the piezoelectric bender transducer enables it to control directly a power relay which, in turn, controls the various elements of the dryer.

It is, therefore, an object of this invention to provide a new and novel control circuit having a minimum number of components and relatively simple circuitry and which will function properly to control the operation of an appliance.

Another object of the present invention is to provide a control circuit wherein a single transducer element functions both as an isolation device between a high impedance sensing circuit and a low impedance relay circuit and as a switching element.

Still another object of the present invention is to provide a transducer element which is responsive to a magnetic field to maintain the switching element in a first position and which transducer element is responsive to a voltage developed thereacross to maintain the switching element in a second condition.

A still further object of the present invention is to provide a control circuit for use in an appliance which control circuit includes a transducer element responsive to a magnetic field and which magnetic field may be variable to control the sensitivity of the transducer element.

BRIEF DESCRIPTION OF THE DRAWINGS

FIGURE 1 is a simplified schematic diagram of a control circuit for use in controlling the operation of an appliance;

FIGURE 2 is a more detailed schematic diagram showing the cooperation of the control circuit of FIGURE 1 with that of the electrical components of a clothes dryer; and FIGURE 3 is an elevational view of a piezoelectric bender transducer and a possible mounting as used in the control circuits of FIGURES 1 and 2.

DESCRIPTION OF THE PREFERRED EMBODIMENTS

Although the principles of the present invention are of particular utility when used in combination with a clothes dryer such as that described in U.S. application Ser. No. 425,302, filed Jan. 13, 1965, issued Nov. 12, 1968 as U.S. Patent No. 3,409,997, and assigned by the applicants, Clifton A. Cobb and Gordon J. Krolzick, to Whirlpool Corporation, assignee of the present invention, it will be understood that the control circuit of the present invention may be used in other appliances, such as washing machines, toasters, ovens and the like.

Seen in FIGURE 1 is a simplified schematic diagram of a control circuit constructed in accordance with the principles of this invention. The control circuit 60 includes a pair of terminals 61 and 62 adapted to be connected to a source of alternating current. The terminal 61 is connected to a line 63 through a start switch 64. Also, the terminal 62 is connected to a line 66.

Corrected in parallel with the start switch 64 is a holding contactor 67 which is associated with and actuated by a relay 68. A pair of stationary contacts 69 and 70 are associated with the contactor 67.

Connected across the lines 63 and 66 is a charging circuit comprising a resistor 71 and a capacitor 72. The resistor 71 is shown as a variable resistor but it will be understood that the resistor 71 may be a fixed resistor or a series of fixed resistors switched in the circuit by a suitable switching device. As the control circuit of FIGURE 1 is adapted to be connected to a source of alternating current, a diode 73 is connected in series with the resistor 71 and capacitor 72 to cause half-wave pulses to be applied to the charging circuit during operation of the control circuit. The diode 73 may be eliminated should the control circuit of FIGURE 1 be connected to a direct current source.

A sensor 54 is connected in parallel with the capacitor 72. Sensor 54 comprises a pair of electrically isolated electrodes and is positioned within the interior of the drum of a clothes dryer to sense the relative dryness of the clothing positioned within the dryer as it bridges the electrodes. One such sensor and its location within a dryer is more fully set forth in U.S. application Ser. No. 548,678, filed May 9, 1966, issued July 9, 1968 as U.S. Patent No. 3,391,468, and assigned by the applicant, Douglas J. Walker, to Whirlpool Corporation, assignee of the present invention. The wetness of the clothes functions as a variable resistor connected in parallel with the capacitor 72 thereby controlling the level of charge build-up on the capacitor. Therefore, when the capacitor 72 reaches a predetermined voltage level a control signal is developed which will deactuate the control circuit thereby terminating the sequence or the operation of the dryer.

In accordance with the present invention a piezoelectric bender transducer element 74 is connected in parallel with the sensor 54 and the capacitor 72. The voltage developed across the capacitor 72 is applied across transducer 74 and causes it to move in a direction to break the circuit between the lines 66 and 76. This action deenergizes the relay coil 68 which, in turn, opens the contactor 67 to deenergize the entire control circuit.

Transducer 74 forms a movable contactor and functions as a switching device between the lines 66 and 76. Transducer 74 is normally in the closed position as shown in FIGURE 1. A magnet 77 is positioned so as to attract transducer 74 against switch contact 76a. The function of magnet 77 is to exert a force on transducer 74 such that a torque must be developed in the transducer 74 before it can overcome the magnetic force, whereupon it will suddenly snap open. This snap action is desirable when controlling inductive loads such as coil 68 in order to quickly and completely break power thereto. Although the magnet 77, is shown as an electromagnet, it will be understood that a permanent magnet will function equally well to maintain the transducer 74 in the closed position until sufficient torque is developed to allow element 74 to snap away. A coil 78 is wrapped about the magnet 77 and is connected in series with a variable resistor 79. The resistor 79 and coil 78 are adapted to be connected to a source of energizing current through terminals 80 and 81.

In operation, assuming power is applied to terminals 61 and 62, closing the start switch 64 will energize the relay coil 68 thereby causing the contactor 67 to engage the stationary contact 69. Therefore, the self-locking contactor of the relay 68 will maintain the circuit energized during the remainder of the cycle and the start switch 64 can be released. It will be understood that energizing current to the coil 78 of the electromagnet 77 is applied to the coil simultaneously with the closure of the start switch 64.

The diode 73 allows only half-wave pulses of direct current to be applied to the charging circuit consisting of resistor 71 and capacitor 72. The capacitor 72 will charge to a value proportional to the resistance sensed across the sensing element 54. Therefore, wet clothes within the drum of the dryer will cause a low resistance to be sensed by the sensing element 54 and a relatively low charge will appear across capacitor 72. The low voltage across the capacitor 72 is also sensed across the transducer 74 and causes the transducer 74 to tend to bend in a direction to move away from the terminal 76a. However, the magnetic field of the electromagnet 77 is sufficient to maintain the transducer 74 in the closed position, as shown in FIGURE 1. As the clothes within the drum of the dryer become dry, the resistance sensed by the sensing element 54 increases which, in turn, allows the voltage level across the capacitor 72 to increase. The increased voltage level across the capacitor 72 is also applied across the transducer 74 which tends to move the transducer 74 upwardly, as shown in FIGURE 1, and disconnect the line 76 from the line 66. When the torque generated in transducer 74 is sufficient to overcome the magnetic field of magnet 77, it will snap away from the contact 76a. This action will deenergize the relay coil 68 which, in turn, causes the contactor 67 to disengage the stationary contact 69 and engage the stationary contact 70. This action indicates the termination of the drying operation of the dryer.

The charge across the capacitor 72 is discharged through resistor 82, contact 70 and contactor 67 and the resistor 83 to the other side of the capacitor 72.

Seen in FIGURE 2 is a somewhat simplified circuit arrangement of a clothes dryer utilizing the unique control circuit of the present invention. A motor 33 is connected across terminals 61 and 62 to be energized from the source of alternating current. The motor 33 includes a start winding 86 and a run winding 87. The start winding 86 is connected in parallel with the run winding 87 through a centrifugal switch 88. A short time after the motor 33 is energized, the armature will reach a predetermined speed which causes the centrifugal switch 88 to open thereby maintaining the motor 33 energized through the run winding 87.

A movable contactor 89 is connected in parallel with a thermostatic switch 90 and the contactor 89 and thermostatic switch 90 are connected in series with the motor 33. The thermostatic switch 90 functions as a cool down thermostat to maintain the motor 33 energized after terminating application of heat to the interior of the dryer. Accordingly, the cool down thermostat 90 is normally open and closes after initiation of the drying cycle due to the high temperature exhaust of the dryer. The movable contactor 89 is associated with the relay coil 68 which is energized upon closure of the start switch 64.

A third terminal 91 is provided for connection to a 240 volt source of alternating current which is applied to an electric heater 92. It will be understood that a gas heater may be substituted for the electric heater shown in FIGURE 2. A second centrifugal switch 93 is connected in series with the heater 92 and operated by the motor 33. The centrifugal switch 93 insures that the motor 33 is energized and rotating the dryer drum before the heater 92 is energized. Also connected in series with the heater 92 and the centrifugal switch 93 is a movable contactor 94. The movable contactor 94 is closed when the drying cycle is initiated and remains closed until the relay coil 68 is deenergized by flexure of the transducer 74.

The movable contactors 67, 89 and 94 are ganged together and actuated upon energization of the relay coil 68. The sensing and control circuit of FIGURE 2 is identical to that shown on FIGURE 1 with the exception that the capacitor discharge circuit, consisting of resistors 82 and 83, is not shown. Also, a permanent magnet 77a is shown in FIGURE 2 rather than an electromagnet.

In operation, the drying cycle is initiated by depressing the push-to-start switch 64 which applies power to the relay coil 68 through the transducer 74. This action closes the movable contactors 67, 89 and 94. The contactor 89 energizes the motor 33 and the centrifugal switch 88 is opened after a predetermined armature speed is obtained thereby deenergizing the start winding 86. Also, the second centrifugal switch 93 closes to energize the heater element 92. The movable contactor 67 shunts the start switch 64 and functions as a locking contactor to maintain the relay coil 68 energized during the drying cycle of the dryer. It will be understood that the movable contactor 94 is also closed upon energization of the relay coil 68 thereby applying electrical power to the heater 92.

The control circuit of the present invention is operated from a series of half-wave pulses passing through the diode 73. Accordingly, the power applied to the control circuit will be pulsating direct current and fed through the timing resistor 71 to the charging capacitor 72. As long as the clothing within the drying drum remains wet, the sensor will sense essentially a short circuit thereby preventing the capacitor 72 from charging. As the clothing within within the drying drum becomes dry, capacitor 72 becomes charged proportional to the resistance sensed by the sensor 54. By way of example, and not by way of limitation, a voltage charge of approximately 70 volts will cause sufficient torque to be generated in the transducer 74 to allow it to snap away from permanent magnet 77a and, as shown on the drawing, open the switch formed by the transducer 74 and disconnect line 76 from line 66 which, in turn, deenergizes the relay coil 68.

Deenergization of the relay coil 68 immediately opens the movable contactors 67, 89 and 94 to disable the heater element 92 and the control circuit 60. However, the motor will continue to run through the normally open cool down thermostat which is now closed due to the heat generated in the exhaust duct of the dryer. As soon as the temperature in the exhaust duct decreases sufficient to allow the thermostat to open, the motor will be deenergized and the drying cycle is completely terminated.

Seen in FIGURE 3 is the detailed construction of the piezoelectric bender transducer element 74 used in the circuit arrangement of FIGURES 1 and 2. The piezoelectric bender trandsucer is a laminar unit which includes a pair of piezoelectric strips 96 and 97 the outer surfaces of which each have formed thereon a silver conductive coating or layer 98 and 99, respectively. The conductive layers 98 and 99 serve as contact means on the piezoelectric strips 96 and 97. Also, the conductive layer 99 serves as a movable contactor switch connecting the line 66 to the line 76. A terminal 100 is disposed to contact the conductive layer 98 and a termnial 101 is disposed to contact the layer 99. Due to the properties of piezoelectric material, the impedance between contacts 100 and 101 is on the order of $10^{14}$ ohms. This assures that in the circuit of FIGURE 1, the impedance of transducer 74 will not appreciably load the sensing circuit consisting of diode 73, resistor 71, and capacitor 72. The terminals 100 and 101 are secured or positioned on an electrically insulative or non-conductive block 102. A third terminal 76a which also forms the magnet 77a is secured to a non-conductive block 104.

In accordance with the present invention a ferromagnetic member 106 is soldered or otherwise fixedly secured to the conductive layer 99. The ferromagnetic member 106 which may conveniently comprise a ferrous metal, is disposed in the magnetic field of the magnet 77a and is thus attracted by the magnet 77a thereby providing a complete circuit between the leads 66 and 76. However, as mentioned hereinabove, when a voltage is applied between terminals 66 and 75 the voltage gradient across the layers of the piezoelectric bender transducer will cause the layers to bend upwardly, as indicated by the arrow 107, to interrupt the current flow between the lines 66 and 76.

Accordingly, the piezoelectric bender transducer element 74 of the present invention provides sufficiently high impedance isolation between the charging capacitor 72 and the relay actuation circuit such that no appreciable charge is bled from capacitor 72 through the relay actuation circuit. These features greatly simplify the circuitry of the control system as well as substantially decreases the cost due to the reduction of the number of components necessary to perform these two functions.

Although minor modifications may be suggested by those versed in the art, it should be understood that I wish to embody within the scope of the patent warranted hereon all such modifications as reasonably come within the scope of my contribution to the art.

The embodiments of the invention in which an exclusive property or privilege is claimed are defined as follows:

1. In a clothes dryer including a rotatable drum for receiving clothes to be dried;
 a motor coupled to said drum for rotating said drum, said motor adapted for connection to a power source; means for heating the interior of said drum; and sensing means positioned within said interior of said drum for sensing the relative dryness of the clothes within said drum; the improvement therein comprising, resistance and capacitance means connected in series with one another and connected across the power source to charge said capacitance means from the power source, said sensing means connected in parallel with said capacitance means for controlling the charge on said capacitance means in response to the condition of dryness of the clothes within said drum; contactor means coupled to said motor and operable to control the operation of said clothes dryer; and transducer means connected in parallel with said capacitance means and said sensing means to produce mechanical movement in response to the charge on said capacitance means, said transducer means including at least two layers of piezoelectric material, one of said layers connected to one side of said capacitance means and the other of said layers connected to the other side of said capacitance means, a ferromagnetic strip secured to the outer surface of one of said layers to form a movable contact of said contactor means, and a magnet positioned in proximity to said ferromagnetic strip for applying a force to said ferromagnetic strip to oppose movement thereof until said capacitance means is charged to a predetermined value.

2. A clothes dryer according to claim 1 wherein said magnet means is an electromagnet and further including means in circuit with said electromagnet to vary the current through said electromagnet thereby varyng the voltage charge required across said capacitance means to produce said mechanical movement of said transducer means.

References Cited

UNITED STATES PATENTS

| | | | |
|---|---|---|---|
| 2,980,841 | 4/1961 | Bearinger et al. | 200—181 X |
| 3,271,877 | 9/1966 | Guenther et al. | 34—45 |
| 2,835,761 | 5/1958 | Crownover | 310—8.5 X |
| 3,180,038 | 4/1965 | Chafee | 34—45 |
| 3,266,167 | 8/1966 | Finnegan | 34—45 |
| 3,343,272 | 9/1967 | Janke et al. | 34—45 |

JOHN J. CAMBY, Primary Examiner

U.S. Cl. X.R.

200—181